(12) United States Patent
Yoon et al.

(10) Patent No.: US 11,119,571 B2
(45) Date of Patent: Sep. 14, 2021

(54) METHOD AND DEVICE FOR DISPLAYING VIRTUAL IMAGE

(71) Applicant: SAMSUNG ELECTRONICS CO., LTD., Suwon-si (KR)

(72) Inventors: Chi-yul Yoon, Hwaseong-si (KR); Jae-woo Ko, Uiwang-si (KR); Ji-woon Yeom, Suwon-si (KR); Kyu-sub Kwak, Seoul (KR); Jae-Eun Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/637,604

(22) PCT Filed: Jul. 11, 2018

(86) PCT No.: PCT/KR2018/007840
§ 371 (c)(1),
(2) Date: Feb. 7, 2020

(87) PCT Pub. No.: WO2019/059506
PCT Pub. Date: Mar. 28, 2019

(65) Prior Publication Data
US 2020/0201428 A1    Jun. 25, 2020

(30) Foreign Application Priority Data
Sep. 22, 2017    (KR) .................. 10-2017-0122888

(51) Int. Cl.
*G06F 3/00* (2006.01)
*G06F 3/01* (2006.01)
(Continued)

(52) U.S. Cl.
CPC ......... *G06F 3/013* (2013.01); *G02B 27/0172* (2013.01); *G06T 19/006* (2013.01);
(Continued)

(58) Field of Classification Search
None
See application file for complete search history.

(56) References Cited

U.S. PATENT DOCUMENTS 6,377,370 B1    4/2002  Taketomi et al.
7,218,598 B2    5/2007  Kim et al.
(Continued)

FOREIGN PATENT DOCUMENTS

KR      10-1387097 B1     4/2014
KR   10-2014-0128134 A   11/2014
(Continued)

OTHER PUBLICATIONS

Communication dated Jul. 17, 2020 by the European Patent Office in counterpart European Patent Application No. 18857633.4.
(Continued)

*Primary Examiner* — Martin Mushambo
(74) *Attorney, Agent, or Firm* — Sughrue Mion, PLLC

(57) ABSTRACT

Provided is a virtual image display device including: an image generator outputting a virtual image; a filter transmitting light in a first polarization state in the output virtual image; a multipath optical element guiding the transmitted light in the first polarization state; a first optical element arranged on a first side of the multipath optical element and allowing the guided light in the first polarization state and real-world light to pass therethrough; a second optical element arranged on a second side opposite to the first side of the multipath optical element and allowing the real-world light to pass therethrough; and a processor controlling the image generator, the first optical element, and the second optical element.

20 Claims, 10 Drawing Sheets

(51) Int. Cl.
*G02B 27/01* (2006.01)
*G06T 19/00* (2011.01)

(52) U.S. Cl.
CPC .. *G02B 2027/011* (2013.01); *G02B 2027/014* (2013.01); *G06T 2215/16* (2013.01)

(56) References Cited

U.S. PATENT DOCUMENTS

| | | | |
|---|---|---|---|
| 7,230,905 | B2 | 6/2007 | Kim et al. |
| 8,988,463 | B2 | 3/2015 | Stone Perez et al. |
| 9,292,973 | B2 | 3/2016 | Bar-Zeev et al. |
| 9,304,319 | B2 | 4/2016 | Bar-Zeev et al. |
| 9,626,887 | B2 | 4/2017 | Lee et al. |
| 9,639,986 | B2 | 5/2017 | Cho et al. |
| 9,734,402 | B2 | 8/2017 | Jang et al. |
| 10,175,485 | B2 | 1/2019 | Kang et al. |
| 2011/0109528 | A1 | 5/2011 | Mun et al. |
| 2013/0242392 | A1* | 9/2013 | Amirparviz .......... G02B 5/3058 359/485.05 |
| 2013/0300635 | A1 | 11/2013 | White et al. |
| 2015/0103318 | A1 | 4/2015 | Lee et al. |
| 2015/0220157 | A1 | 8/2015 | Marggraff et al. |
| 2015/0248046 | A1 | 9/2015 | Schowengerdt |
| 2016/0109705 | A1 | 4/2016 | Schowengerdt |
| 2016/0161740 | A1 | 6/2016 | Bar-Zeev et al. |
| 2016/0189426 | A1 | 6/2016 | Thomas et al. |
| 2016/0189432 | A1 | 6/2016 | Bar-Zeev et al. |
| 2017/0023794 | A1 | 1/2017 | Macnamara |
| 2017/0059869 | A1 | 3/2017 | Lee |
| 2018/0268611 | A1* | 9/2018 | Nourai .................. G06T 19/006 |

FOREIGN PATENT DOCUMENTS

| | | |
|---|---|---|
| KR | 10-2015-0084200 A | 7/2015 |
| KR | 10-2015-0129546 A | 11/2015 |
| KR | 10-2016-0059406 A | 5/2016 |
| KR | 10-2017-0010042 A | 1/2017 |
| KR | 10-2017-0045149 A | 4/2017 |
| KR | 10-2017-0100641 A | 9/2017 |
| WO | 2016/118918 A1 | 7/2016 |

OTHER PUBLICATIONS

Communication dated Oct. 26, 2018 issued by the International Searching Authority in counterpart Application No. PCT/KR2018/007840 (PCT/ISA/210 and PCT/ISA/237).

* cited by examiner

METHOD AND DEVICE FOR DISPLAYING
VIRTUAL IMAGE

TECHNICAL FIELD

The present disclosure relates to a method of displaying a virtual image, a device for displaying the virtual image, and a system having recorded thereon a program for performing the method of displaying the virtual image.

BACKGROUND ART

Augmented reality (AR) refers to a technology which synthesizes virtual objects or information into a real-world environment so that the virtual objects or information may look as if they exist in the real-world environment. AR technology may be used in various applications including military applications, aviation, medicine, video games, entertainment, sports, etc.

With a growing attention towards AR technology, various techniques for implementing AR have been actively developed. In particular, research has been actively carried out on a near-eye display technique for displaying an image by directly projecting the image on a users retina.

However, a conventional technology does not solve the problem of causing eye fatigue due to failure to adjust a position where a virtual image is displayed by taking into account a user's gaze convergence distance and characteristics of a real-world scene sensed by the user.

DESCRIPTION OF EMBODIMENTS

Technical Problem

Provided are a method and device for displaying a virtual image, which are capable of lessening, when a user experiences augmented reality (AR) via superimposition of the virtual image onto a real world, user fatigue caused by a failure to display the virtual image at a gaze convergence distance or a mismatch between the virtual image and a real-world scene by adjusting a focal length for the virtual image being displayed.

Solution to Problem

The present disclosure relates to a virtual image display device including: an image generator outputting a virtual image; a filter transmitting light in a first polarization state in the output virtual image; a multipath optical element guiding the transmitted light in the first polarization state; a first optical element arranged on a first side of the multipath optical element and allowing the guided light in the first polarization state and real-world light to pass therethrough; a second optical element arranged on a second side opposite to the first side of the multipath optical element and allowing the real-world light to pass therethrough; and a processor controlling the image generator, the first optical element, and the second optical element, wherein the first optical element diverges the light in the first polarization state and converges light in a second polarization state, and the second optical element converges the light in the first polarization state and diverges the light in the second polarization state.

BEST MODE

Figure 1:
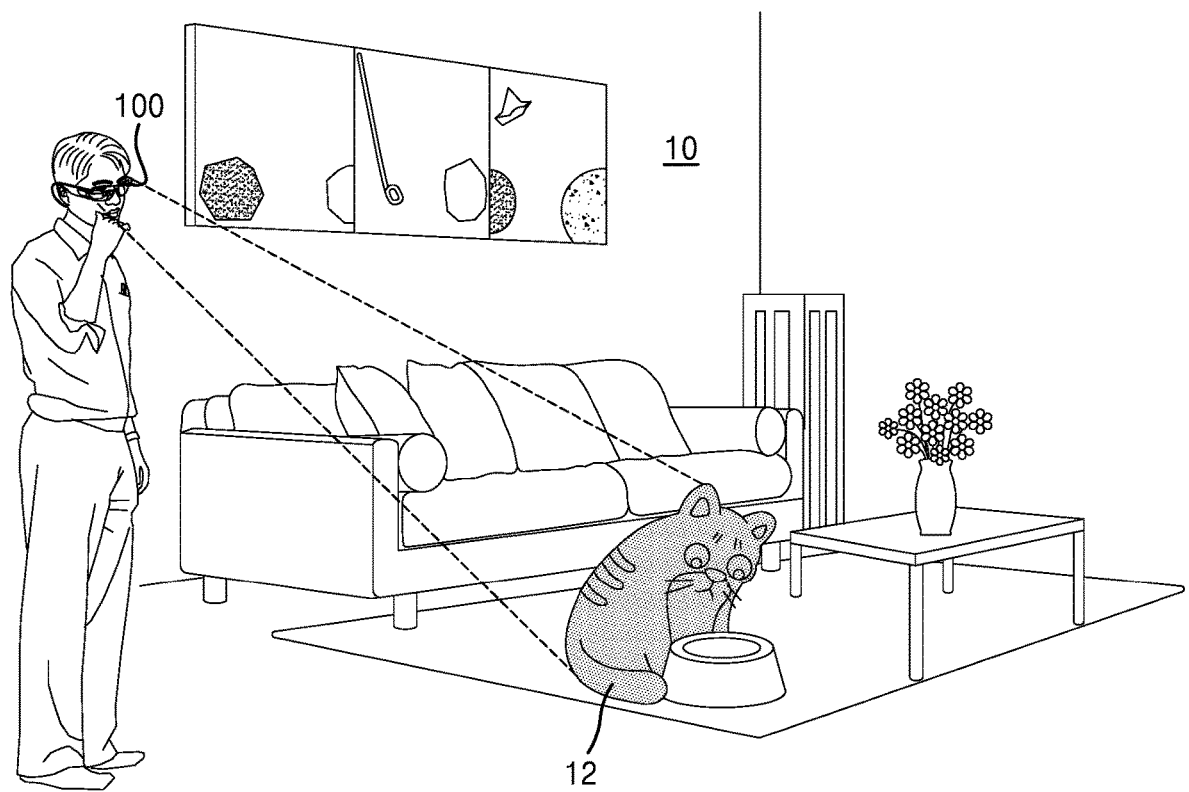
FIG. 1 is a conceptual diagram for explaining a method of displaying a virtual image according to an embodiment.

According to an embodiment, a virtual image display device includes: an image generator outputting a virtual image; a filter transmitting light in a first polarization state in the output virtual image; a multipath optical element guiding the transmitted light in the first polarization state; a first optical element arranged on a first side of the multipath optical element and allowing the guided light in the first polarization state and real-world light to pass therethrough; a second optical element arranged on a second side opposite to the first side of the multipath optical element and allowing the real-world light to pass therethrough; and a processor controlling the image generator, the first optical element, and the second optical element, wherein the first optical element may diverge the light in the first polarization state and converge light in a second polarization state while the second optical element may converge the light in the first polarization state and diverge the light in the second polarization state.

The virtual image display device may further include an image sensor acquiring at least one piece of eye movement data of a user, and the processor may determine a user's gaze based on the acquired at least one piece of eye movement data and determine the virtual image output from the image generator based on the user's gaze.

The processor may determine depth information of a real-world object based on a position of the virtual image display device and determine the virtual image output from the image generator based on the determined depth information.

The processor may determine, according to a direction and a distance where the user's gaze converges, at least one of a size of the virtual image, a three-dimensional orientation in which the virtual image is displayed, a shadow, a texture, a binocular disparity, and a sharpness of the virtual image.

The virtual image display device may further include a light blocking element arranged in a direction on one side of the second optical element and changing its color according to an applied electrical signal, and as the color of the light blocking element changes, passage of the real-world light may be blocked.

When the real-world light passing through the second optical element diverges, the first optical element may be controlled to output an optical power for controlling the real-world light passing through the second optical element to converge by a range of the divergence, and when the real-world light passing through the second optical element converges, the first optical element may be controlled to output an optical power for controlling the real-world light passing through the second optical element to diverge by a range of the convergence.

The processor may determine a focal length at which the virtual image is output according to the user's gaze and determine electrical signals to be applied to the first and second optical elements based on the determined focal length, and output values of the first and second optical elements may be determined according to the electrical signals applied thereto.

The processor may determine a focal length at which the virtual image is output according to the user's gaze and determine a polarization direction of the light of the virtual image transmitted by the filter based on the determined focal length.

The polarization direction of the light transmitted by the filter may be determined according to an electrical signal applied to the filter.

When light of the virtual image polarized in a specific direction is incident on the first optical element and the second optical element, a polarization direction of the incident light may be changed, and divergence or convergence of the incident light may be determined according to the specific direction in which the light is polarized.

According to another embodiment, a virtual image display device includes: an image generator outputting a virtual image; a multipath optical element guiding light of the virtual image; a first optical element arranged on a first side of the multipath optical element and allowing the guided light and real-world light to pass therethrough; a second optical element arranged on a second side opposite to the first side of the multipath optical element and allowing the real-world light to pass therethrough; and a processor determining a user's gaze, generating a virtual image corresponding to the user's gaze, and controlling the image generator, the first optical element, and the second optical element, wherein the second optical element may be set to converge light when the first optical element diverges the light and to diverge light when the first optical element converges the light.

According to another embodiment, a virtual image display method includes: obtaining a virtual image; obtaining light in a first polarization state from the virtual image by transmitting the obtained virtual image through a filter; and applying electrical signals respectively to first and second optical elements such that the second optical element located on a side opposite to a side where the first optical element is located converges real-world light while the first optical element diverges the converged real-world light and the light in the first polarization state. The light in the first polarization state transmitted by the filter and the real-world light passing through the second optical element may be guided through a multipath optical element located between the first and second optical elements and then projected onto the first optical element, and the first optical element may diverge the light in the first polarization state and converge light in a second polarization state while the second optical element may converge the light in the first polarization state and diverge the light in the second polarization state.

According to another embodiment, a virtual image display method includes: determining a virtual image; determining a focal length at which the virtual image is output based on a direction and a distance of a user's gaze; and applying electrical signals respectively to first and second optical elements such that the second optical element located on a side opposite to a side where the first optical element is located converges real-world light according to the determined focal length while the first optical element diverges the converged real-world light and light of the virtual image, wherein the light of the virtual image and the converged real-world light passing through the second optical element may be guided through a multipath optical element located between the first and second optical elements and then projected onto the first optical element.

Mode of Disclosure

Terms used in the present specification will now be briefly described and then the present disclosure will be described in detail.

The terms used in the present disclosure are general terms currently widely used in the art based on functions described in the present disclosure, but may have different meanings according to an intention of one of ordinary skill in the art, precedent cases, advent of new technologies, etc. Furthermore, some terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

It will be understood that, although the terms including an ordinal number such as "first", "second", etc. may be used herein to describe various elements, these elements should not be limited by the terms. The terms are only used to distinguish one element from another element. For example, a first element to be discussed below may be termed a second element without departing from the scope of the present disclosure. Similarly, a second element may be termed a first element. As used herein, the term "and/or" includes any and all combinations of one or more of the associated listed items.

Throughout the specification, when a part "includes" or "comprises" an element, unless there is a particular description contrary thereto, the part can further include other elements, not excluding the other elements. Furthermore, as used herein, the term "unit" denotes a software element or a hardware element such as a field-programmable gate array (FPGA) or an application-specific integrated circuit (ASIC), and performs certain functions. However, the term "unit" is not limited to software or hardware. The "unit" may be formed so as to be in an addressable storage medium, or may be formed so as to operate one or more processors. Thus, for example, the term "unit" may include elements such as software elements, object-oriented software elements, class elements and task elements, processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units".

Embodiments of the present disclosure will now be described more fully hereinafter with reference to the accompanying drawings so that they may be easily implemented by one of ordinary skill in the art. However, the present disclosure may have different forms and should not be construed as being limited to the descriptions set forth herein. Parts not related to the present disclosure are omitted to clarify the description of embodiments thereof, and like reference numerals denote like elements throughout.

FIG. 1 is a conceptual diagram for explaining a method of displaying a virtual image according to an embodiment.

Referring to FIG. 1, a virtual image display device 100 may output a virtual image 12 superimposed on a real world 10 seen by a user, such that the user may experience augmented reality.

According to an embodiment, the virtual image display device 100 may track a user's gaze such that the output virtual image 12 may be detected by a user's eyes. The virtual image display device 100 may determine a shape of the output virtual image 12 based on a distance and a direction of the user's gaze, which are obtained as a result of the tracking.

Meanwhile, when a position of a focal point onto which the virtual image 12 is focused by the virtual image display device 100 does not coincide with a position where the user's gaze converges, this may increase eye fatigue when the user views the virtual image 12. According to an embodiment, the virtual image display device 100 may variably adjust an optical power of an optical element in the virtual image display device 100, such that the virtual image 12 may be focused at a position where the user's gaze converges. In this case, the optical power may represent a refractive index that determines a focal length of an optical element. A method performed by the virtual image display device 100 to variably adjust an optical power will be described in more detail below with reference to FIG. 2.

As the virtual image 12 is detected, the user wearing the virtual image display device 100 may experience augmented reality by viewing an augmented reality image in which the virtual image 12 is superimposed on the real world 10. In this case, as the virtual image 12 and the real world 10 are superimposed on each other and recognized, the focal length of the optical element adjusted with respect to the virtual image 12 may distort a scene of the real world 10. In order to prevent this, the virtual image display device 100 according to an embodiment may use some of a plurality of optical elements therein for adjusting a focal length for the virtual image 12 and the rest thereof for correcting distortion of the scene of the real world 10, thereby providing an augmented reality image in which the virtual image 12 is superimposed on the undistorted scene of the real world 10.

In addition, according to an embodiment, the virtual image display device 100 may be implemented in various forms. Examples of the virtual image display device 100 described in the present specification may include a smart glass, a head mounted display (HMD), etc., but this is merely an embodiment, and the virtual image display device 100 is not limited thereto.

Figure 2:
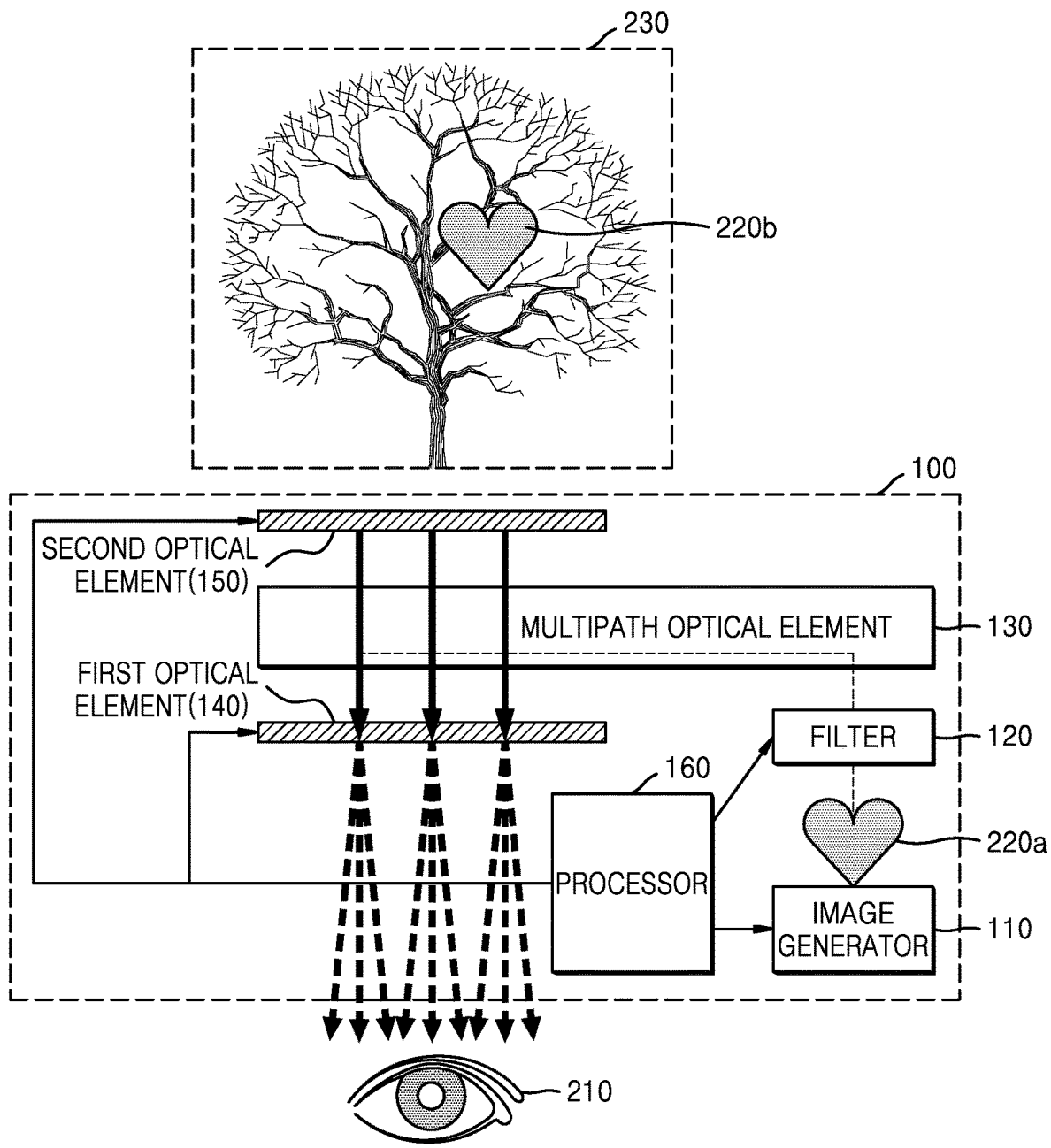
FIG. 2 is a block diagram for explaining a virtual image display device according to an embodiment.

FIG. 2 is a block diagram for explaining a virtual image display device 100 according to an embodiment.

Referring to FIG. 2, the virtual image display device 100 may include an image generator 110, a filter 120, a multipath optical element 130, a plurality of optical elements, i.e., first and second optical elements 140 and 150, and a processor 160. However, this is merely an embodiment, and components of the virtual image display device 100 are not limited to the above example.

The image generator 110 outputs a virtual image 220a superimposed on a real-world scene 230. As the virtual image 220a corresponding to a user's gaze is determined by the processor 160, the image generator 110 may output the determined virtual image 220a. The virtual image 220a output from the image generator 110 may enter the multipath optical element 130 via the filter 120.

The filter 120 may transmit light in a preset polarization direction with respect to the virtual image 220a received from the image generator 110. For example, the filter 120 may transmit only a left circular polarized (LCP) light signal of the received virtual image 220a or only a right circular polarized (RCP) light signal thereof. However, this is merely an embodiment, and the polarization direction of the light transmitted by the filter 120 is not limited to the above example.

In addition, the filter 120 may include a polarizer and a quarter waveplate, but this is merely an embodiment, and the configuration of the filter 120 is not limited to the above-described example.

The polarization direction of the light transmitted by the filter 120 may be changed according to a focal length at which the virtual image 12 is focused. This will be described in more detail below with reference to FIG. 5.

The multipath optical element 130 may guide the light of the virtual image 220a transmitted by the filter 120 such that the transmitted light of the virtual image 220a may be incident on a user's eye 210. The multipath optical element 130 may be configured to have a structure in which a medium with a low refractive index surrounds a medium with a high refractive index. According to the above-described configuration, the light of the virtual image 220a transmitted by the filter 120 may be delivered onto the user's eye 210 while traveling along the multipath optical element 130.

The first optical element 140 may be arranged on a first side of the multipath optical element 130. In this case, the first side may be the side where the user's eye 210 is located. The first optical element 140 may be located between the user's eye 210 and the multipath optical element 130.

The first optical element 140 may have a first optical power that controls the light of the virtual image 220a guided by the multipath optical element 130 and light of the real-world scene 230 to diverge or converge. According to an embodiment, the guided light of the virtual image 220a and the light of the real-world scene 230, which are incident on the first optical element 140, may diverge or converge depending on the direction of incidence, and the direction of the light may be changed accordingly.

For example, a LCP light signal incident on the first optical element 140 may be diverged by the first optical element 140. Furthermore, the LCP light signal may be changed into a RCP light signal as it passes through the first optical element 140. As another example, a RCP light signal incident on the first optical element 140 may be converged by the first optical element 140. Furthermore, the RCP light signal may be changed into a LCP light signal as it passes through the first optical element 140.

Meanwhile, the virtual image 220a entering the first optical element 140 may be composed of only a LCP light signal by the filter 120 as described above. Accordingly, the light of the virtual image 220a passing through the first optical element 140 may diverge. Here, the degree of divergence of the light of the virtual image 220a may be determined according to a focal length determined based on a user's gaze.

Furthermore, a RCP light signal, from among signals of various directions included in real-world light incident on the first optical element 140, may diverge as it passes through the first optical element 140, while a LCP light signal may converge as it passes through the first optical element 140. The real-world scene 230 may be distorted while passing through the first optical element 140 for adjusting a focal length set with respect to the virtual image 220a. According to an embodiment, the virtual image display device 100 may correct distortion in advance by controlling the real-world scene 230 to pass through the second optical element 150 before passing through the first optical element 140.

The second optical element 150 may be arranged on a second side of the multipath optical element 130 that is opposite to the first side thereof. The second optical element 150 may have a second optical power for correcting divergence or convergence of the real-world light due to the first optical power. For example, a LCP light signal of the real-world scene 230 that has passed through the second optical element 150 may be changed into a RCP light signal while diverging. Furthermore, as the RCP light signal passes through the first optical element 140, the RCP light signal may be changed into the LCP light signal while converging. In this case, the degrees of divergence or convergence by the second optical element 150 and the first optical element 140 may be set to be equal to each other.

Accordingly, the LCP signal of the real-world scene 230 that has passed through the second and first optical elements 150 and 140 may be incident on the user's eye 210 without distortion. As another example, like in the above example of the LCP light signal, a RCP light signal of the real-world scene 230 may also be incident on the user's eye 210 without distortion by allowing the RCP light signal to sequentially pass through the second optical element 150 and the first optical element 140.

According to an embodiment, the virtual image display device 100 includes the second optical element 150 and the first optical element 140 having the same convergence or divergence range, thereby allowing adjustment of a focal length with respect to the virtual image 220a without any distortion of the real-world scene 230.

The processor 160 may determine a user's gaze by tracking the user's gaze. Furthermore, the processor 160 may obtain a virtual image corresponding to the user's gaze. For example, the processor 160 may determine, according to a distance and a direction of a user's gaze, at least one of an absolute/relative size of a virtual image, a three-dimensional (3D) orientation, a texture, lighting of a position of a real-world object where the virtual image is to be displayed, a shadow, a binocular disparity, and a sharpness of the virtual image.

Furthermore, the processor 160 may determine a focal length for positioning the virtual image at a convergence distance of the user's gaze. The processor 160 may determine electrical signals to be respectively applied to the first and second optical elements 140 and 150 according to the determined focal length. Here, focal lengths of the first optical element 140 and the second optical element 150 may vary according to the electrical signals applied by the processor 160. For example, the degree of divergence or convergence of incident light in a specific polarization direction may be determined according to the electrical signals applied to the first and second optical elements 140 and 150.

Figure 3:
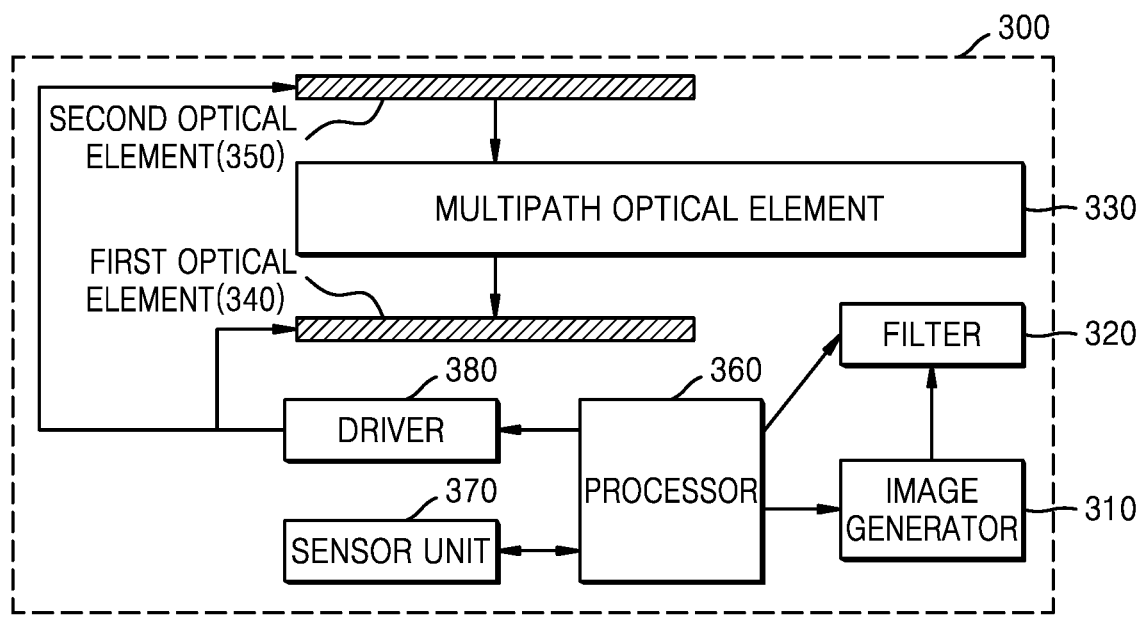
FIG. 3 is a block diagram of a virtual image display device according to another embodiment.

FIG. 3 is a block diagram of a virtual image display device 300 according to another embodiment.

Referring to FIG. 3, the virtual image display device 300 may include an image generator 310, a filter 320, a multipath optical element 330, a plurality of optical elements, i.e., first and second optical elements 340 and 350, a processor 360, a sensor unit 370, and a driver 380. However, this is merely an embodiment, and components of the virtual image display device 300 are not limited to the above example.

In the present embodiment, because the image generator 310, the filter 320, the multipath optical element 330, and the first and second optical elements 340 and 350 respectively correspond to the image generator 110, the filter 120, and the multipath optical element 130, and the first and second optical elements 140 and 150 described with reference to FIG. 2, detailed descriptions thereof will be omitted here.

In order to determine a user's gaze, the processor 360 may obtain a plurality of images that are captured of the user's eye by the sensor unit 370. The processor 360 may determine a distance and a direction at which the user's gaze converges, based on center points of the eye extracted from the plurality of images.

As the user's gaze is determined, the processor 360 may determine an output virtual image. A method whereby the processor 360 determines a virtual image may correspond to the method described with reference to FIG. 2.

Furthermore, the processor 360 may determine focal lengths of the first and second optical elements 340 and 350 based on the distance and the direction where the user's gaze converges. In addition, in order to set the determined focal lengths, the processor 360 may determine electrical signals to be respectively applied to the first and second optical elements 340 and 350.

The sensor unit 370 may measure movement of a user's eyeball by using visible light, infrared light, or a bio-signal. Furthermore, the sensor unit 370 may measure the movement of the users eyeball at preset time intervals in order to track the user's gaze in real-time. The sensor unit 370 may provide the processor 360 with a plurality of pieces of eye movement measurement data acquired as a result of the measurement.

The driver 380 may acquire, from the processor 360, information about electrical signals to be respectively applied to the first and second optical elements 340 and 350. The driver 380 may respectively apply electrical signals to the first and second optical elements 340 and 350 based on the information about the electrical signals acquired from the processor 360. As the electrical signals are applied, the focal lengths of the first and second optical elements 340 and 350 may be respectively changed to the focal lengths determined by the processor 360.

Figure 4:
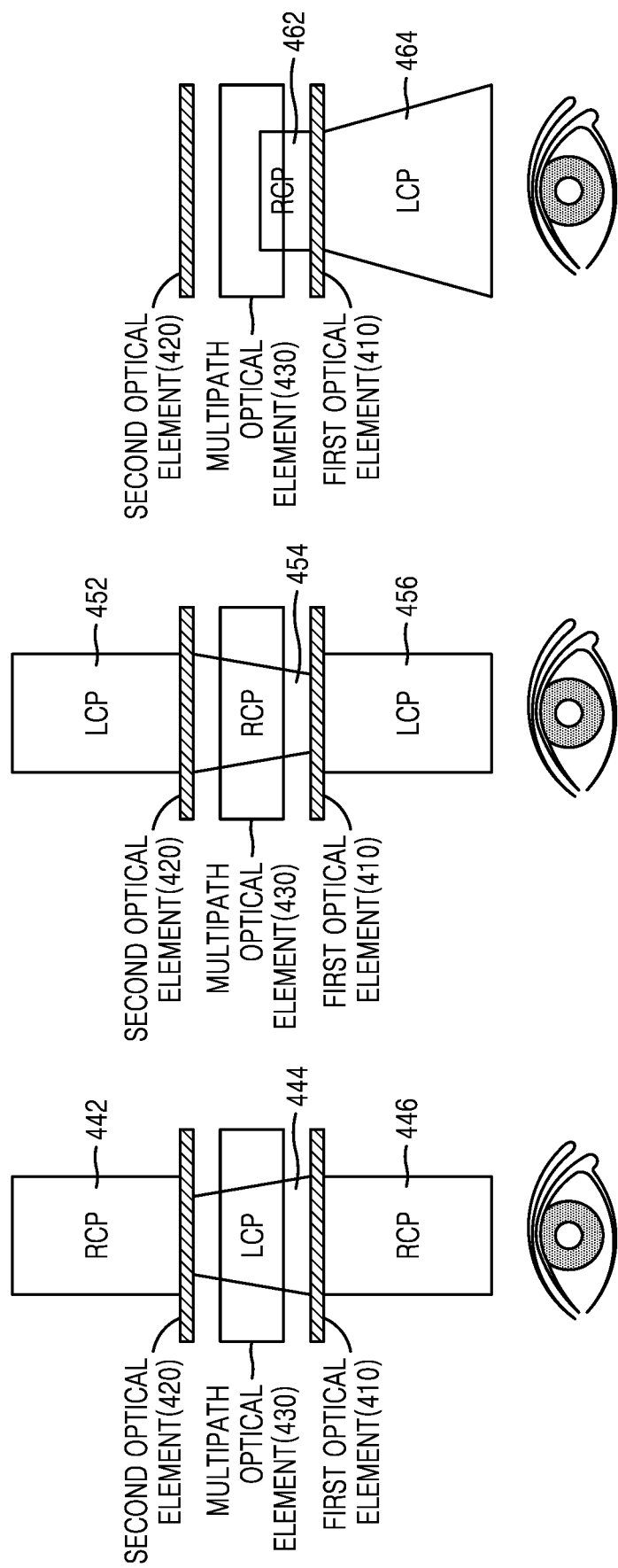
FIG. 4 is a diagram for explaining in more detail operation principles of first and second optical elements included in a virtual image display device, according to an embodiment.

FIG. 4 is a diagram for explaining in more detail operation principles of first and second optical elements 410 and 420 included in a virtual image display device, according to an embodiment.

Referring to FIG. 4, the first optical element 410 and the second optical element 420 may be arranged on opposite sides with respect to a multipath optical element 430. For example, the first optical element 410 may be located on a first side between a user's eye and the multipath optical element 430. Furthermore, the second optical element 420 may be located on a second side that is opposite to the first side.

FIG. 4 shows a process of respectively delivering to a user's eye a RCP light signal 442 of real-world light, a LCP light signal 452 of the real-world light, and a RCP light signal 462 of a virtual image acquired as a result of passing through a filter The RCP light signal 442 of the real-world light may pass through the second optical element 420 and enter the multipath optical element 430. As the RCP light signal 442 passes through the second optical element 420, the RCP light signal 442 may be changed into a LCP light signal 444 while diverging. The LCP light signal 444 may be projected onto the first optical element 410 via the multipath optical element 430.

As the LCP light signal 444 projected onto the first optical element 410 passes through the first optical element 410, the LCP light signal 444 may be changed into a RCP light signal 446 while converging. Accordingly, while reaching the user's eye, the RCP light signal 446 may be incident on the user's eye in the same direction as the RCP light signal 442 of the real-world light.

Furthermore, the LCP light signal 452 of the real-world light may pass through the second optical element 420 and enter the multipath optical element 430. As the LCP light signal 452 passes through the second optical element 420, it may be changed into a RCP light signal 454 while diverging. The RCP light signal 454 may be projected onto the first optical element 410 via the multipath optical element 430.

As the RCP light signal 454 projected onto the first optical element 410 passes through the first optical element 410, the RCP light signal 454 may be changed into a LCP light signal 456 while converging. Accordingly, while reaching the user's eye, the LCP light signal 456 may be incident on the user's eye in the same direction as the LCP light signal 452 of the real-world light.

In addition, according to an embodiment, the virtual image display device may transmit only the RCP light signal 462 of the virtual image to the multipath optical element 430 through the filter. The RCP light signal 462 of the virtual image transmitted to the multipath optical element 430 may be guided through the multipath optical element 430 to be incident on the first optical element 410.

The RCP light signal 462 of the virtual image may be projected onto the first optical element 410 via the multipath optical element 430. As the RCP light signal 462 of the virtual image projected onto the first optical element 410 passes through the first optical element 410, the RCP light signal 462 may be changed into a LCP light signal 464 while diverging. Accordingly, the virtual image may be focused at a focal length corresponding to the degree of divergence so that the virtual image may appear as overlapping the real-world scene when seen by the user.

Furthermore, the degrees of convergence or divergence of an image respectively by the first optical element 410 and the second optical element 420 may be determined according to a focal length determined based on a convergence distance of a user's gaze, as described above with reference to FIGS. 2 and 3.

Figure 5:
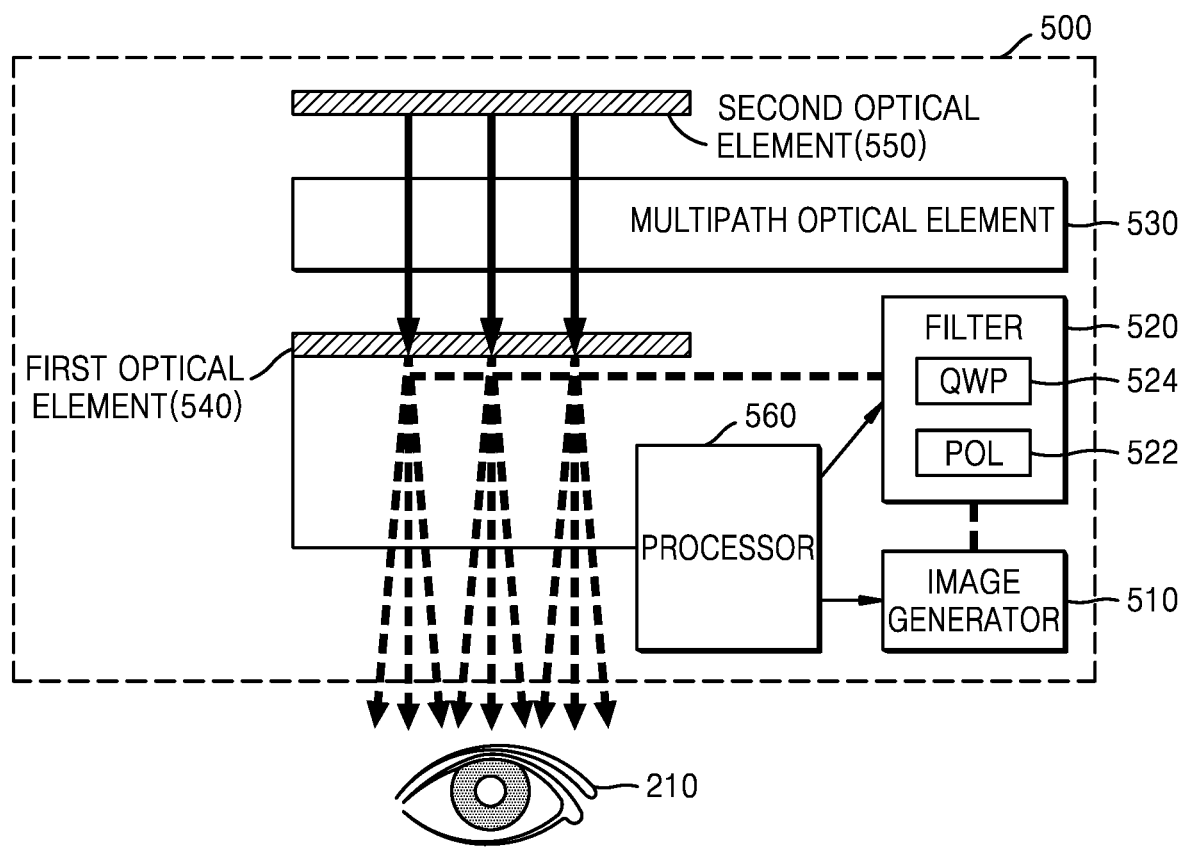
FIG. 5 is a block diagram for explaining a filter of a virtual image display device according to another embodiment.

FIG. 5 is a block diagram for explaining a filter 520 of a virtual image display device 500 according to another embodiment.

Referring to FIG. 5, the virtual image display device 500 may include an image generator 510, the filter 520, a multipath optical element 530, a plurality of optical elements, i.e., first and second optical elements 540 and 550, and a processor 560. However, this is merely an embodiment, and components of the virtual image display device 500 are not limited to the above example.

In the present embodiment, because the image generator 510, the filter 520, the multipath optical element 530, and the first and second optical elements 540 and 550 respectively correspond to the image generator 110, the filter 120, and the multipath optical element 130, and the first and second optical elements 140 and 150 described with reference to FIG. 2, detailed descriptions thereof will be omitted here.

The processor 560 may obtain a virtual image according to a direction and a distance of a user's gaze. A method whereby the processor 560 obtains a virtual image may correspond to the method described above with reference to FIG. 2.

The processor 560 may determine whether light from the virtual image entering a user's eye 210 should diverge or converge according to a convergence distance of a user's gaze. For example, when the convergence distance of the user's gaze exceeds a reference distance preset in the virtual image display device 500, a focal length may be set to be greater than the preset reference distance only when light of the virtual image enters the user's eye 210 as converging light.

Meanwhile, because RCP light that is incident on the first optical element 540 of the virtual image display device 500 diverges while LCP light that is incident on the first optical element 540 converges, the processor 560 may control the filter 520 such that the LCP light is incident on the first optical element 540. For example, the processor 560 may control a polarization direction of light of the virtual image transmitted through the filter 520 by applying an electrical signal to the filter 520. In the present embodiment, it is assumed that the filter 520 is an active filter that changes the polarization direction of transmitted light according to an applied electrical signal.

According to another embodiment, when the convergence distance of the user's gaze is within the reference distance preset in the virtual image display device 500, the processor 560 may set a focal length such that light of the virtual image is incident on the user's eye 210 as diverging light. Accordingly, the processor 560 may control the filter 520 such that RCP light is incident on the first optical element 540.

Although it has been described in the present embodiment that when RCP light is incident on the first and second optical elements 540 and 550, the RCP light diverges while when LCP light is incident thereon, the LCP light converges, this is merely an embodiment, and according to another embodiment, the virtual image display device 500 may include an optical element configured to converge RCP light when the RCP light is incident thereon and diverge LCP light when the LCP light is incident thereon.

Figure 6:
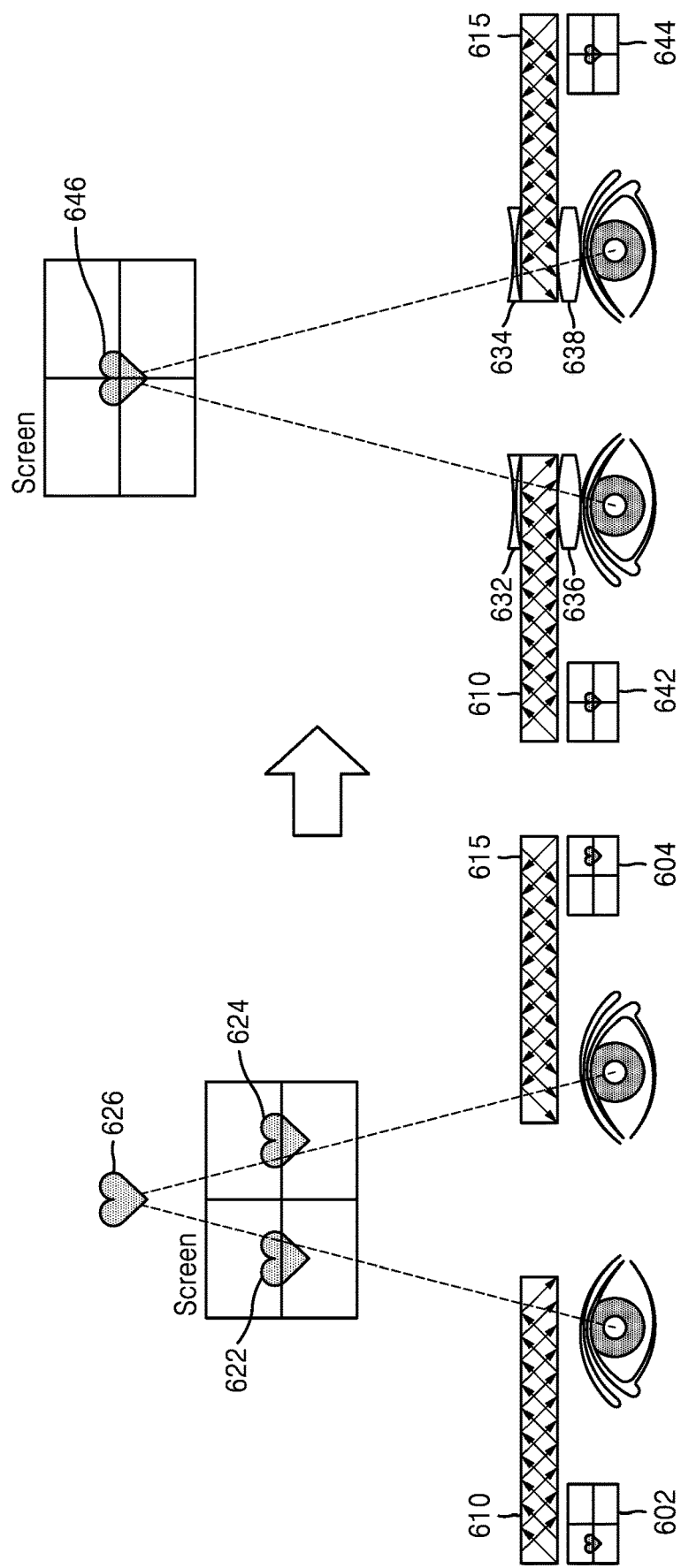
FIG. 6 is a diagram for explaining a method performed by a virtual image display device to adjust a focal length to match a convergence distance of a user's gaze, according to an embodiment.

FIG. 6 is a diagram for explaining a method performed by a virtual image display device to adjust a focal length to match a convergence distance of a user's gaze, according to an embodiment.

Referring to FIG. 6, in a virtual image display method according to the related art, to induce a sense of distance with regard to a virtual image, left- and right-eye images 602 and 604 at different positions are respectively projected onto a user's left and right eyes, thereby enabling the user to perceive a sense of distance. For example, the left-eye image 602 and the right-eye image 604 that are output to multipath optical elements 610 and 615 respectively arranged at a predetermined distance away from the user's left and right eyes may be respectively guided into the left and right eyes, so that the user may view the virtual image.

However, according to this method, focal lengths 622 and 624 at which corresponding images are projected from the left and right eyes do not match a convergence distance 626 of a user's actual gaze, and thus the user may feel uncomfortable about the mismatch.

According to an embodiment, the virtual image display device may include pairs of first and second optical elements 636 and 632 and 638 and 634 arranged on first and second sides of the multipath optical elements 610 and 615, respectively, so that a focal length may match a convergence distance of a user's gaze. Virtual images 642 and 644 transmitted to the multipath optical elements 610 and 615 are respectively guided though the multipath optical elements 610 and 615 to enter a user's eyes via the first optical elements 636 and 638. Here, the first optical elements 636 and 638 may have a focal length 646 determined according to the convergence distance of the user's gaze.

Furthermore, according to an embodiment, the virtual image display device may correct, via the second optical elements 632 and 634, distortion of a real-world scene that may be caused by the first optical elements 636 and 638. Because this method corresponds to those described above with reference to FIGS. 2 and 3, a detailed description thereof will be omitted here.

Figure 7:
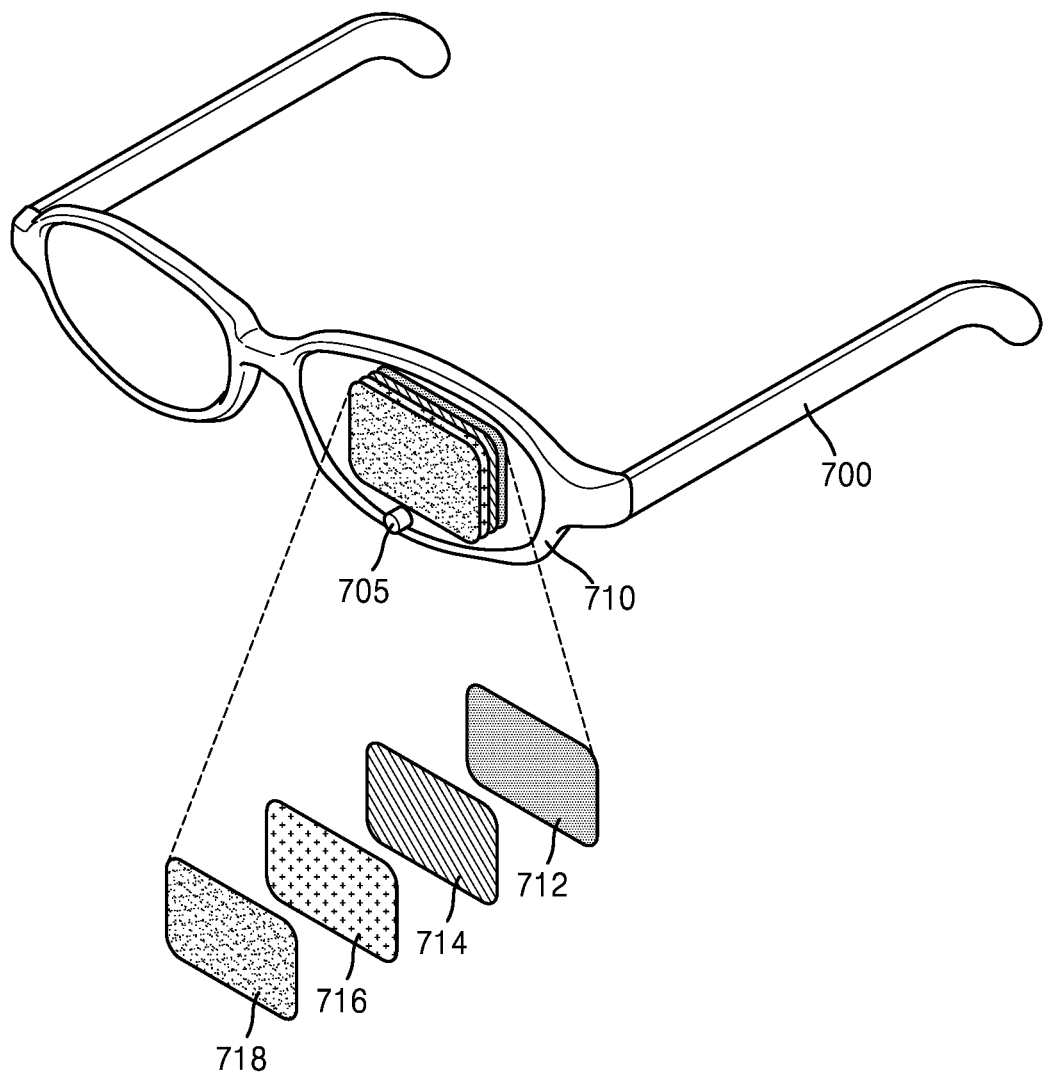
FIG. 7 is a diagram for explaining a method performed by a virtual image display device to block a part of real-world light in order to view a virtual image, according to an embodiment.

FIG. 7 is a diagram for explaining a method performed by a virtual image display device 700 to block a part of real-world light in order to view a virtual image, according to an embodiment.

Referring to FIG. 7, according to an embodiment, the virtual image display device 700 may include a sensor unit 705, a first optical element 712, a multipath optical element 714, a second optical element 716, and a light entry blocking element 718. Meanwhile, in the present embodiment, only components necessary for describing a method of blocking a part of real-world light for viewing a virtual image are illustrated, and components of the virtual image display device 700 are not limited to the above components.

The sensor unit 705 may acquire at least one piece of eye movement data by sensing movement of a user's eyeball. A convergence distance of a user's gaze may be determined based on the eye movement data acquired via the sensor unit 705. Accordingly, focal lengths of the first and second optical elements 712 and 716 may be adjusted to correspond to the convergence distance of the user's gaze Meanwhile, even when the virtual image display device 700 according to an embodiment displays a virtual image to appear superimposed on a real-world scene, the visibility of the virtual image may be degraded due to light delivering the real world scene.

To solve this, the virtual image display device 700 according to an embodiment may block, via the light entry blocking element 718, a part of real-world light corresponding to only a portion where the virtual image is displayed. As a part of the real-world light is blocked via the light entry blocking element 718, real-world light corresponding to a portion where the virtual image is not displayed may be delivered to a user's eyes through the second optical element 716, the multipath optical element 714, and the first optical element 712.

Accordingly, the user cannot only experience the augmented reality where the virtual image is superimposed onto the real-world light but also view the virtual image more clearly due to occlusion of a part of the real world light.

Figure 8:
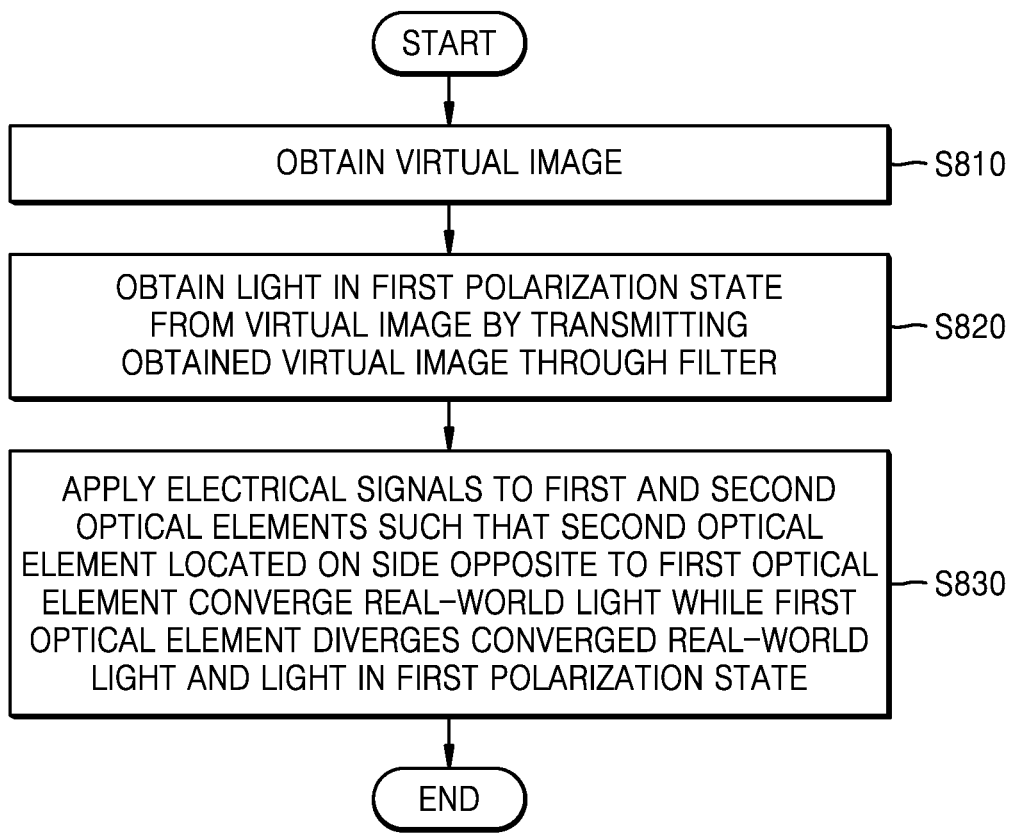
FIG. 8 is a flowchart of a method performed by a virtual image display device to display a virtual image and a real-world scene, according to an embodiment.

FIG. 8 is a flowchart of a method performed by a virtual image display device to display a virtual image and a real-world scene, according to an embodiment.

In operation S810, the virtual image display device obtains a virtual image.

The virtual image display device may obtain a virtual image determined according to a user's gaze. Here, for example, the virtual image display device may acquire information about a direction and a distance of the user's gaze by tracking the user's gaze. According to another example, the virtual image display device may receive information about the direction and distance of the user's gaze from an external device or may acquire the information via a sensor provided in the virtual image display device.

In operation S820, the virtual image display device may transmit the obtained virtual image through a filter to obtain light in a first polarization state from the virtual image.

The virtual image display device may input the virtual image to a filter that transmits light in a preset polarization direction. For example, the filter may transmit only a LCP light signal of the received virtual image or only a RCP light signal.

In operation S830, the virtual image display device may respectively apply electrical signals to first and second optical elements such that the second optical element located on a side opposite to a side where the first optical element is located converges real-world light while the first optical element diverges the converged real-world light and light in a first polarization state.

The virtual image display device may adjust a focal length at which the virtual image is focused by applying an electrical signal to an optical element to change an optical power of the optical element so that the virtual image is focused at a convergence distance of a user's gaze. For example, when the convergence distance of the users gaze is d1, the virtual image display device may adjust an electrical signal to be applied to the first optical element so that the focal length may be set to d1'. Light in a specific polarization direction, which is incident on the first optical element to which the adjusted electrical signal is applied, may diverge or converge to focus a virtual image at the adjusted focal length. In addition, the virtual image display device may set an optical power of the second optical element to prevent the real-world scene from being distorted by the first optical element.

Accordingly, the real-world light that has passed through the second optical element having the second optical power for diverging light by a specific range may pass through the first optical element having a first optical power for converging light by the specific range, and thus, distortion of the real-world scene can be corrected. Furthermore, the real world light that has passed through the second optical element having the second optical power for converging light to a specific range may pass through the first optical element having the first optical power for diverging light to the specific range, and thus, distortion of the real-world scene can be corrected.

Figure 9:
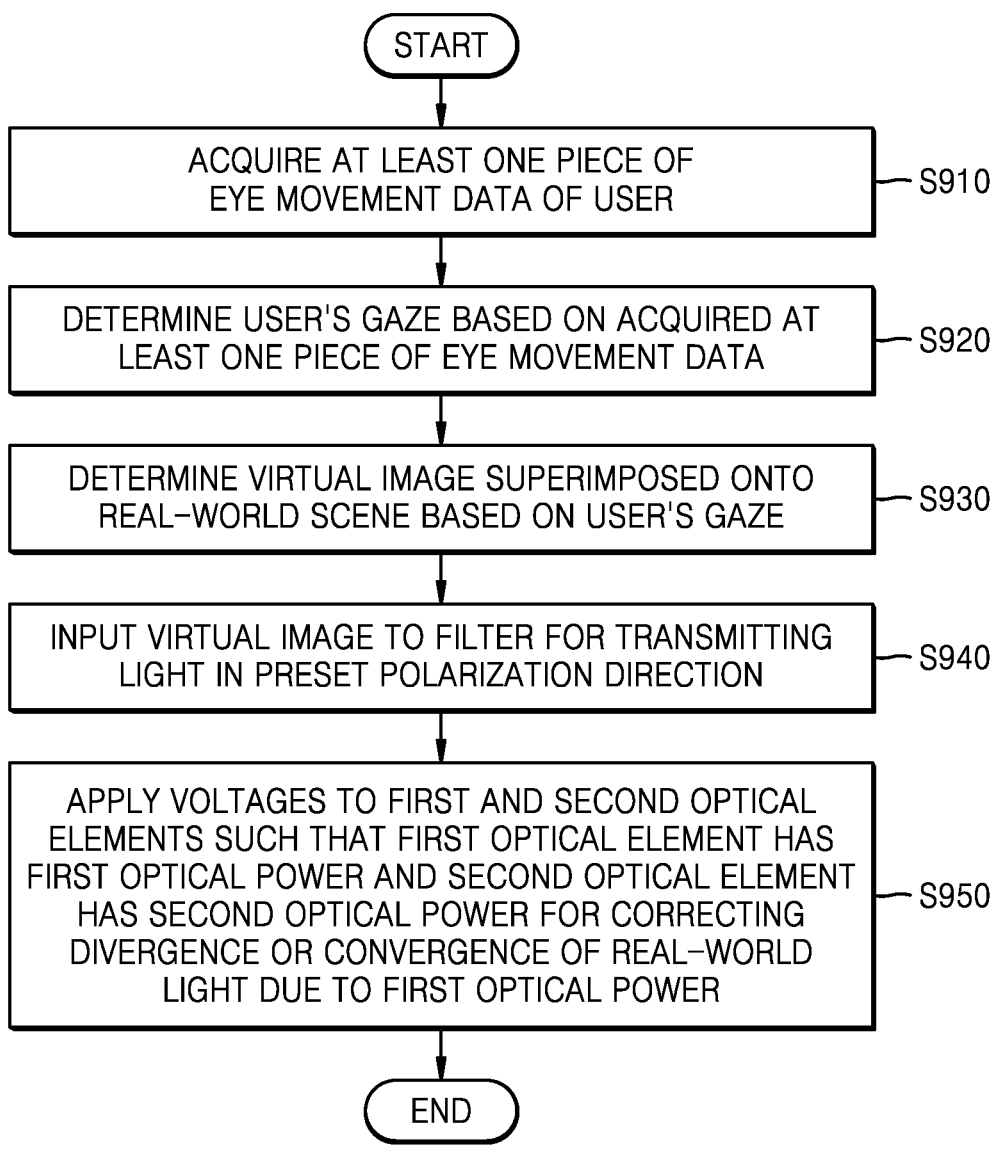
FIG. 9 is a flowchart of a method performed by a virtual image display device to display a virtual image and a real-world scene by tracking a user's gaze, according to an embodiment.

FIG. 9 is a flowchart of a method performed by a virtual image display device to display a virtual image and a real-world scene by tracking a users gaze, according to an embodiment.

In operation S910, the virtual image display device may acquire at least one piece of eye movement data of a user. To determine a users gaze, the virtual image display device may acquire at least one piece of eye movement data by measuring movement of a user's eyeball via a sensor provided therein.

In operation S920, the virtual image display device may determine the users gaze based on the acquired at least one piece of eye movement data. The virtual image display device may determine, based on the at least one piece of eye movement data, a distance and a direction where the user's gaze converges. For example, the virtual image display device may determine the direction and distance of the users gaze by respectively detecting centers of the pupils of both eyes of the user from a plurality of pupil images and determining an angle between the centers of the pupils with respect to a point where the pupils of both eyes converge.

In operation S930, the virtual image display device may determine, based on the user's gaze, a virtual image superimposed onto a real-time scene.

For example, the virtual image display device may determine, according to the distance and direction of the user's gaze, at least one of an absolute/relative size of a virtual image, a 3D orientation, a texture, lighting of a position of a real-world object where the virtual image is to be displayed, a shadow, a binocular disparity, and a sharpness of the virtual image, and render the virtual image according to a result of the determination.

In operation S940, the virtual image display device may input the virtual image to a filter that transmits light in a preset polarization direction.

As the virtual image is input to the filter, the filter may transmit the light in the preset polarization direction. Meanwhile, the polarization direction of the light transmitted by the filter may be determined according to characteristics of a plurality of optical elements with adaptively varying focal lengths and the convergence distance of the user's gaze. Here, the polarization direction of the light transmitted by the filter may be determined in the same manner as described above with reference to FIG. 5.

In operation S950, the virtual image display device may respectively apply electrical signals to first and second optical elements such that the first optical element has a first optical power and the second optical element has a second optical power for correcting divergence or convergence of real-world light due to the first optical power.

In addition, operation S950 may correspond to operation S830 described above with reference to FIG. 8.

Figure 10:
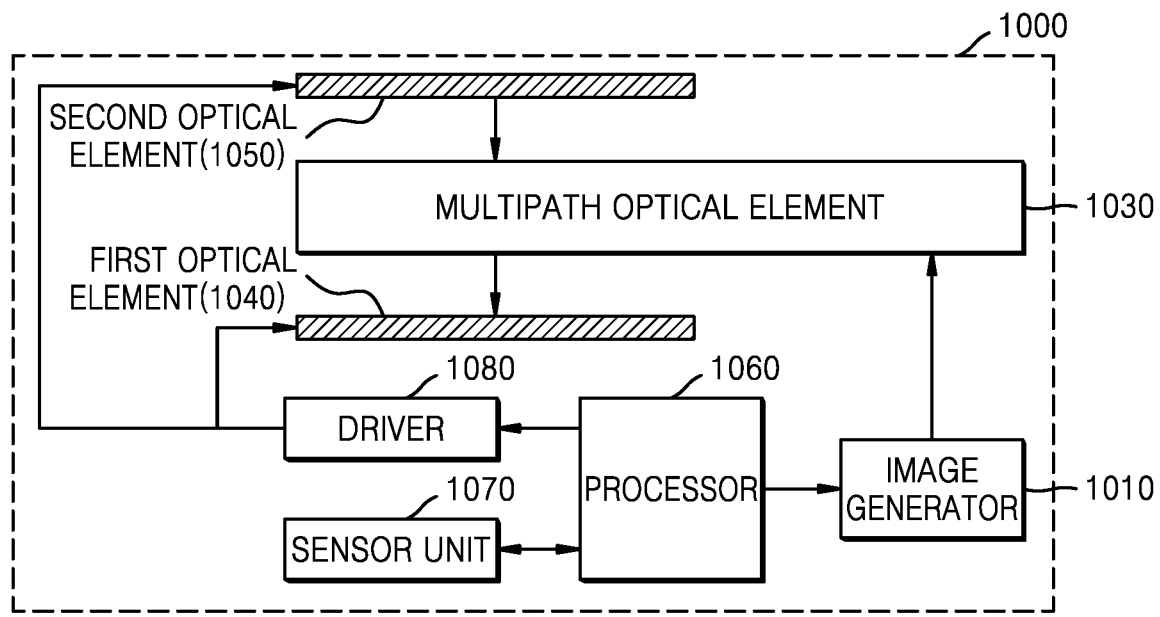
FIG. 10 is a block diagram of a virtual image display device according to another embodiment.

FIG. 10 is a block diagram of a virtual image display device 1000 according to another embodiment.

Referring to FIG. 10, the virtual image display device 1000 may include an image generator 1010, a multipath optical element 1030, a plurality of optical elements, i.e., first and second optical elements 1040 and 1050, a processor 1060, a sensor unit 1070, and a driver 1080. However, this is merely an embodiment, and components of the virtual image display device 1000 are not limited to the above example.

The image generator 1010 may output a virtual image superimposed onto a real-time scene. As a virtual image corresponding to a user's gaze is determined by the processor 1060, the image generator 1010 may output the determined virtual image. The virtual image output from the image generator 110 may be delivered to the multipath optical element 1030.

The multipath optical element 1030 may guide transmitted light of the virtual image so that the virtual image output by the image generator 1010 may enter a user's eye. The virtual image may be delivered to the user's eye via the first optical element 1040 while traveling along the multipath optical element 1030.

The first optical element 1040 may be arranged on a first side of the multipath optical element 1030. In this case, the first side may mean a side where the user's eye is located. The first optical element 1040 may be located between the user's eye and the multipath optical element 1030.

The first optical element 1040 may have a first optical power that controls the light of the virtual image guided by the multipath optical element 1030 and real-world light to diverge or converge.

The real-world light may suffer from distortion as it passes through the first optical element 1040 for adjusting a focal length set with respect to the virtual image. According to an embodiment, the virtual image display device 1000 may correct distortion in advance by controlling the real-world light to pass through the second optical element 1050 before passing through the first optical element 1040

The second optical element 1050 may be arranged on a second side of the multipath optical element 1030 that is opposite to the first side thereof. The second optical element 1050 may have a second optical power for correcting divergence or convergence of the real-world light due to the first optical power.

Accordingly, the real-world light that has passed through the second optical element 1050 and the first optical element 1040 may be incident on the user's eye without distortion.

The processor 1060 may determine a user's gaze by tracking the user's gaze. The processor 1060 may obtain a virtual image corresponding to the determined user's gaze.

Furthermore, the processor 1060 may determine a focal length for positioning the virtual image at a convergence distance of the user's gaze. The processor 1060 may determine electrical signals to be respectively applied to the first and second optical elements 1040 and 1050 according to the determined focal length. Here, focal lengths of the first optical element 1040 and the second optical element 1050 may vary according to the electrical signals applied by the processor 1060.

The sensor unit 1070 may measure movement of a user's eyeball by using visible light, infrared light, or a bio-signal. Furthermore, the driver 1080 may acquire, from the processor 1060, information about electrical signals to be respectively applied to the first and second optical elements 1040 and 1050. The driver 1080 may respectively apply electrical signals to the first and second optical elements 1040 and 1050 based on the information about the electrical signals acquired from the processor 1060.

Because the sensor unit 1070 and the driver 1080 may correspond to the sensor unit 370 and the driver 380 described above with reference to FIG. 3, detailed descriptions thereof will be omitted here.

Figure 11:
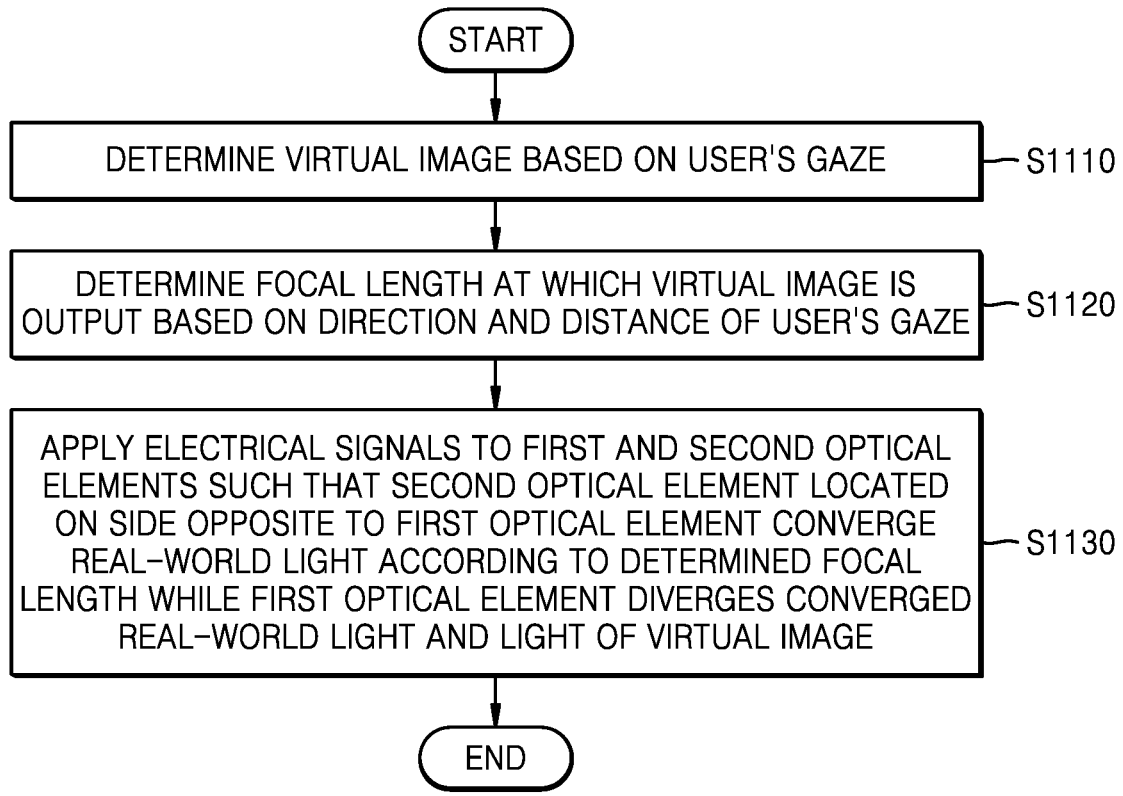
FIG. 11 is a flowchart of a method performed by a virtual image display device to display a virtual image and a real-world scene, according to another embodiment.

FIG. 11 is a flowchart of a method performed by a virtual image display device to display a virtual image and a real-world scene, according to another embodiment.

In operation S1110, the virtual image display device may determine a virtual image based on a user's gaze.

The virtual image display device may obtain the virtual image determined according to the user's gaze. Here, for example, the virtual image display device may acquire information about a direction and a distance of the user's gaze by tracking the user's gaze. According to another example, the virtual image display device may receive information about the direction and distance of the user's gaze from an external device or may acquire the information via a sensor provided in the virtual image display device. In operation S1120, the virtual image display device may determine a focal length at which the virtual image is output based on a direction and a distance of the user's gaze.

In operation S1130, the virtual image display device may respectively apply electrical signals to first and second optical elements such that the second optical element located on a side opposite to a side where the first optical element is located converges real-world light according to the determined focal length while the first optical element diverges the converged real-world light and light of the virtual image.

The virtual image display device may determine a focal length for positioning the virtual image at a convergence distance of the user's gaze. The virtual image display device may determine electrical signals to be respectively applied to the first and second optical elements according to the determined focal length. For example, the virtual image display device may determine a focal length of the first optical element so that the virtual image is focused at the convergence distance of the user's gaze. Furthermore, an electrical signal for changing a focal length of the first optical element to the determined focal length may be applied to the first optical element.

In addition, the virtual image display device may adjust a focal length of the second optical element in order to correct the real-world light in advance so that the real-world scene is not distorted by the first optical element. Accordingly, the real-world light may be incident on the first optical element after passing through the second optical element, and thus can be detected by the users eyes without distortion.

Methods according to embodiments of the present disclosure may be implemented in the form of program instructions that may be performed by various types of computers and may be recorded on computer-readable recording media. The computer-readable recording media may include program instructions, data files, data structures, etc. either alone or in combination. The program instructions recorded on the computer-readable recording media may be designed and configured specially for the disclosure or may be known to and be usable by those skilled in the art of computer software Examples of the computer-readable recording media include magnetic media such as hard disks, floppy disks, and magnetic tape, optical media such as compact disk read-only memory (CD-ROM) and digital versatile disks (DVDs), magneto-optical media such as floptical disks, and hardware devices that are specially configured to store and perform program instructions, such as ROM, random access memory (RAM), flash memory, and the like. Examples of program instructions include not only machine code such as that created by a compiler but also higher level language code that may be executed by a computer using an interpreter or the like.

Reference numerals have been provided in the embodiments shown in the figures. Although particular terms have been used to describe the embodiments, the present disclosure is not limited by the particular terms and may encompass all elements that may be generally conceived by those of ordinary skill in the art.

Embodiments may be described in terms of functional block components and various processing steps. Such functional blocks may be implemented by any number of hardware and/or software components configured to perform particular functions. For example, the embodiments may employ various integrated circuit components, such as memory elements, processing elements, logic elements, look-up tables, etc., which may execute a variety of functions under the control of one or more microprocessors or other control devices. Furthermore, the embodiments may employ the same type or different types of cores and different types of CPUs. Similarly to where the elements of the present disclosure are implemented using software programming or software elements, the embodiments may be implemented by any programming or scripting language such as C, C++, Java, assembler, etc., with the various algorithms implemented with any combination of data structures, processes, routines or other programming elements. Functional aspects may be implemented by algorithms that are executed in one or more processors. Furthermore, the embodiments may employ conventional techniques for electronic environment setting, signal processing and/or data processing. Terms such as "mechanism", "element", "means", and "configuration" may be used in a broad sense and are not limited to mechanical or physical components. The terms may include the meaning of a series of software routines in conjunction with processors, etc.

The particular implementations described in the embodiments are illustrative examples and are not intended to otherwise limit the scope of the embodiments in any way. For the sake of brevity, conventional electronic configurations, control systems, software, other functional aspects of the systems may be omitted. Furthermore, connection lines or connection members shown in the figures represent exemplary functional connections and/or physical or logical connections between the elements, and may be presented as various alternative or additional functional connections, physical connections, or logical connections in an actual apparatus. In addition, no element may be essential to the practice of the present disclosure unless the element is specifically described as "essential," "crucial," etc.

The use of the term "the" and similar referents in the context of describing the exemplary embodiments (especially in the context of the following claims) are to be construed to cover both the singular and the plural. Furthermore, when a range is described, the disclosure includes embodiments to which separate values falling within the range are applied (unless there is a particular description contrary thereto), and each separate value is incorporated into the detailed description as if it were individually recited herein. Finally, operations of methods according to embodiments can be performed in any suitable order unless otherwise specified herein or otherwise clearly contradicted by context. The embodiments are not necessarily limited by the order in which the operations are described. The use of any and all examples, or exemplary language (e.g., "such as", etc.) provided herein is intended merely to better illuminate the embodiments and does not pose a limitation on the scope of the embodiments unless otherwise limited by the claims. It will also be understood by those of ordinary skill in the art that various changes, combinations, and modifications may be made therein according to design conditions and factors without departing from the accompanying claims and their equivalents.

The invention claimed is:

1. A virtual image display device comprising:
an image generator outputting light of a virtual image;
a filter transmitting light in a first polarization state from the output light;
an optical element guiding the transmitted light in the first polarization state;
a second optical element arranged in a direction of a second side of the optical element and on which real-world light including light in the first polarization state and light in a second polarization state is incident;
a first optical element arranged in a direction of a first side of the optical element and on which the guided light in the first polarization state and the real-world light that has passed through the second optical element are incident; and
a processor configured to control the first optical element such that the light in the first polarization state is converged, and the second optical element such that the light in the second polarization state is diverged.

2. The virtual image display device of claim 1, further comprising an image sensor acquiring at least one piece of eye movement data of a user,
  wherein the processor determines a user's gaze based on the acquired at least one piece of eye movement data and determines the virtual image output from the image generator based on the user's gaze.

3. The virtual image display device of claim 1, wherein the processor determines depth information of a real-world object based on a position of the virtual image display device and determines the virtual image output from the image generator based on the determined depth information.

4. The virtual image display device of claim 1, wherein the processor determines, according to a direction and a distance where a user's gaze converges, at least one of a size of the virtual image, a three-dimensional orientation in which the virtual image is displayed, a shadow, a texture, a binocular disparity, and a sharpness of the virtual image.

5. The virtual image display device of claim 1, further comprising a light blocking element arranged in a direction on one side of the second optical element and changing its color according to an applied electrical signal,
  wherein, as the color of the light blocking element changes, a part of the real-world light incident on the second optical element is blocked.

6. The virtual image display device of claim 1, wherein, when the real-world light passing through the second optical element diverges, the first optical element is controlled to output an optical power for controlling the real-world light passing through the second optical element to converge by a range of the divergence, and
  wherein, when the real-world light passing through the second optical element converges, the first optical element is controlled to output an optical power for controlling the real-world light passing through the second optical element to diverge by a range of the convergence.

7. The virtual image display device of claim 1, wherein, when the light of the virtual image polarized in a specific direction is incident on the first optical element and the second optical element, a polarization direction of the incident light is changed, and
  wherein divergence or convergence of the incident light is determined according to the specific direction in which the light is polarized.

8. The virtual image display device of claim 1, wherein the processor determines a focal length at which the virtual image is output according to a user's gaze, and determine electrical signals applied to the first optical element and the second optical element based on the determined focal length, and,
  wherein output values of the first optical element and the second optical element are determined according to the applied electrical signal.

9. The virtual image display device of claim 1, wherein the processor determines a focal length at which the virtual image is output according to a user's gaze, and determine a polarization direction of light transmitted from the filter based on the determined focal length.

10. The virtual image display device of claim 9, the polarization direction of light transmitted from the filter is controlled according to an electrical signal applied to the filter.

11. A virtual image display method comprising:
  transmitting, using a filter, light in a first polarization state from light of a virtual image output from an image generator;
  guiding the light in the first polarization state using an optical element; and
  applying electrical signals respectively to a second optical element arranged in a direction of a second side of the optical element and on which real-world light including the light in the first polarization state and light in a second polarization state is incident and to a first optical element arranged in a direction of a first side of the optical element and on which the guided light in the first polarization state and the real-world light that has passed through the second optical element are incident,
  wherein the applying of the electrical signals comprises applying a first electrical signal to the first optical element such that the light in the first polarization state is converged and applying a second electrical signal to the second optical element such that the light in the second polarization state is diverged.

12. The virtual image display method of claim 11, further comprising:
  acquiring at least one piece of eye movement data of a user;
  determining a user's gaze based on the acquired at least one piece of eye movement data; and
  generating the virtual image based on the user's gaze.

13. The virtual image display method of claim 11, further comprising:
  determining depth information of a real-world object based on a position of a virtual image display device; and
  generating the virtual image based on the determined depth information.

14. The virtual image display method of claim 11, further comprising generating the virtual image by determining, according to a direction and a distance where a user's gaze converges, at least one of a size of the virtual image, a three-dimensional orientation in which the virtual image is displayed, a shadow, a texture, a binocular disparity, and a sharpness of the virtual image.

15. The virtual image display method of claim 11, further comprising applying an electrical signal for blocking a part of the real-world light incident on the second optical element to a light blocking element that is arranged in a direction on one side of the second optical element and changes its color according to the applied electrical signal.

16. The virtual image display method of claim 11, wherein, when the real-world light passing through the second optical element diverges, the first optical element is controlled to output an optical power for controlling the real-world light passing through the second optical element to converge by a range of the divergence, and
  wherein, when the real-world light passing through the second optical element converges, the first optical element is controlled to output an optical power for controlling the real-world light passing through the second optical element to diverge by a range of the convergence.

17. The virtual image display method of claim 11, wherein, when the light of the virtual image polarized in a specific direction is incident on the first optical element and the second optical element, a polarization direction of the incident light is changed, and
  wherein divergence or convergence of the incident light is determined according to the specific direction in which the light is polarized.

18. A non-transitory computer readable recording medium having recorded thereon a program for executing the virtual image display method of claim 11 on a computer.

19. The virtual image display method of claim 11, further comprising:
- determining a focal length at which the virtual image is output according to a user's gaze; and
- determining electrical signals applied to the first optical element and the second optical element based on the determined focal length, and,
- wherein output values of the first optical element and the second optical element are determined according to the applied electrical signal.

20. The virtual image display method of claim 11, further comprising:
- determining a focal length at which the virtual image is output according to a user's gaze; and
- determining a polarization direction of light transmitted from the filter based on the determined focal length.

* * * * *